(12) United States Patent
Valentini

(10) Patent No.: US 11,165,297 B2
(45) Date of Patent: Nov. 2, 2021

(54) ELECTRIC MOTOR WITH MAGNETIC GEAR ARRANGEMENT

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 201 days.

(21) Appl. No.: 16/460,500

(22) Filed: Jul. 2, 2019

(65) Prior Publication Data

US 2020/0028396 A1     Jan. 23, 2020

(30) Foreign Application Priority Data

Jul. 17, 2018   (EP) ..................................... 18183964

(51) Int. Cl.
*H02K 1/32*          (2006.01)
*H02K 11/21*         (2016.01)
(Continued)

(52) U.S. Cl.
CPC .............. *H02K 1/32* (2013.01); *B25F 5/001* (2013.01); *B25F 5/008* (2013.01); *H02K 1/12* (2013.01);
(Continued)

(58) Field of Classification Search
CPC .......... H02K 1/32; H02K 1/12; H02K 1/2786; H02K 9/06; H02K 11/21; H02K 7/003
(Continued)

(56) References Cited

U.S. PATENT DOCUMENTS

2004/0226272 A1* 11/2004 Valentini ............ B23Q 11/0046
                                                      55/385.1

2007/0075597 A1*  4/2007 Seidler .................... F04D 29/60
                                                        310/67 R
(Continued)

FOREIGN PATENT DOCUMENTS

EP              3316453 A1    5/2018
WO         2012093670 A1     7/2012
WO     WO-2012093670 A1 *   7/2012 ........... H02K 49/102

OTHER PUBLICATIONS

Machine translation of WO-2012093670-A1. (Year: 2012).*
English language Abstract of EP3316453, (May 2, 2018).
English language Abstract of WO2012093670, (Jul. 12, 2012).

*Primary Examiner* — Michael Andrews
(74) *Attorney, Agent, or Firm* — Ware, Fressola, Maguire & Barber LLP

(57) ABSTRACT

The invention refers to an electric machine (30) comprising an electric motor (15) and a magnetic gear arrangement (20). The motor (15) is a brushless motor with an internal stator (31) and an external rotor (34). The magnetic gear arrangement (20) is located displaced along the longitudinal axis (24) in respect to the electric motor (15). The magnetic gear arrangement (20) comprises a first rotating element (41) with permanent magnets (42) and a second rotating element (44) with permanent magnets (45) both rotatable about the longitudinal axis (24). The second rotating element (44) is connected to an output shaft (46) of the electric machine (30). A static modulator (48) comprising ferromagnetic elements (49) is disposed between the permanent magnets (42; 45) of the rotating elements (41; 44). It is suggested that a venting element (22) comprising electrically isolating material is located between the electric motor (15) and the magnetic gear arrangement (20), thereby electrically isolating the electric motor (15) from the magnetic gear arrangement (20).

14 Claims, 12 Drawing Sheets

(51) Int. Cl.
   *B25F 5/00*   (2006.01)
   *H02K 1/12*   (2006.01)
   *H02K 1/27*   (2006.01)
   *H02K 7/00*   (2006.01)
   *H02K 7/116*  (2006.01)

(52) U.S. Cl.
   CPC ........... *H02K 1/2786* (2013.01); *H02K 7/003* (2013.01); *H02K 7/116* (2013.01); *H02K 11/21* (2016.01)

(58) Field of Classification Search
   CPC ...... H02K 7/116; H02K 49/10; H02K 49/104; H02K 49/106; B25F 5/001; B25F 5/008
   USPC ............................... 310/50, 62–63, 103–109
   See application file for complete search history.

(56)              References Cited

U.S. PATENT DOCUMENTS

| | | | |
|---|---|---|---|
| 2011/0057456 A1* | 3/2011 | Atallah | H02K 49/102 |
| | | | 290/1 C |
| 2014/0216841 A1* | 8/2014 | Winter | H02K 7/1815 |
| | | | 180/271 |
| 2015/0176596 A1* | 6/2015 | Gossling | H02K 5/00 |
| | | | 417/423.1 |
| 2017/0326712 A1 | 11/2017 | Li et al. | |

* cited by examiner

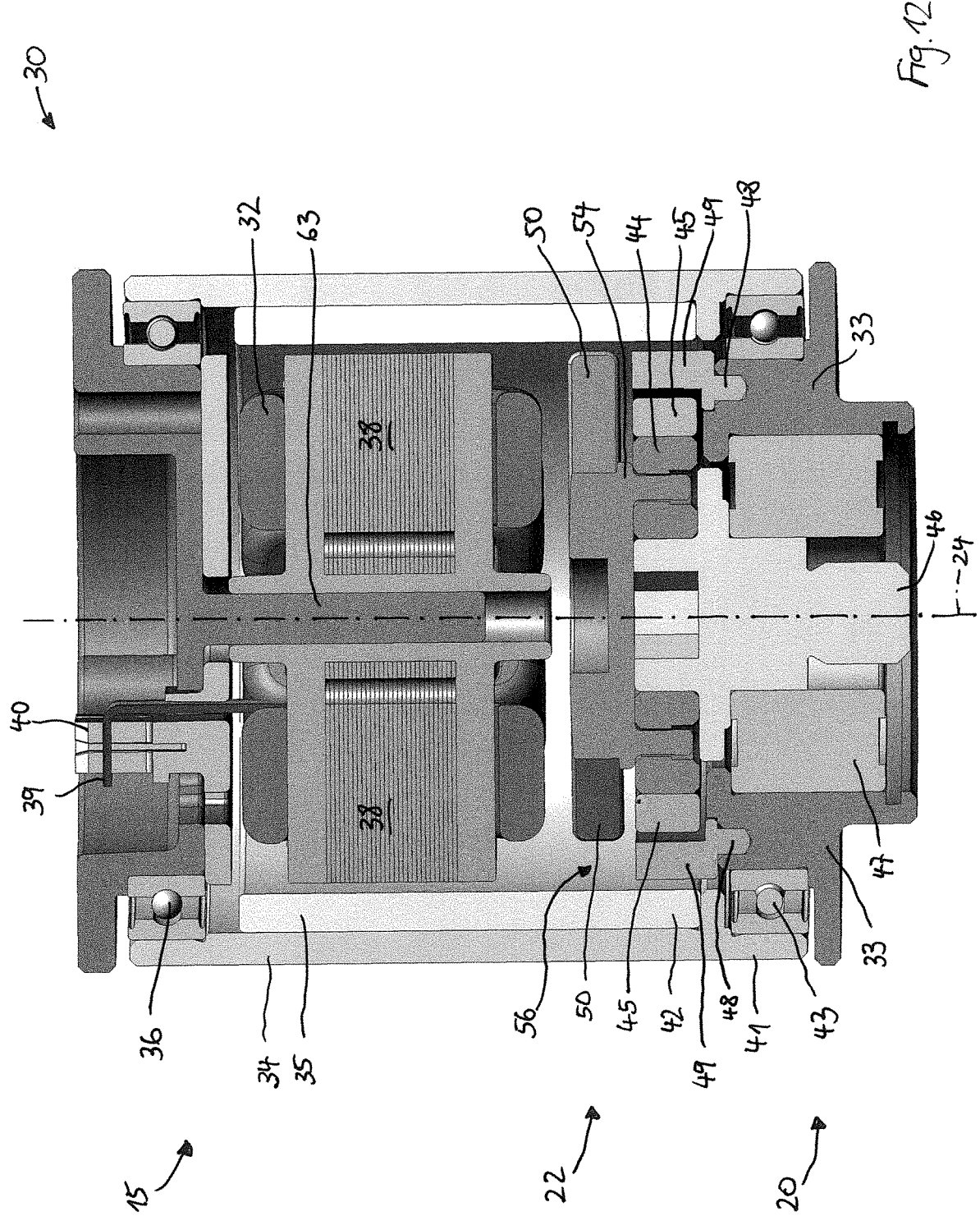

ELECTRIC MOTOR WITH MAGNETIC GEAR ARRANGEMENT

BACKGROUND OF THE INVENTION

1. Field of Invention

In general, the present invention refers to the field of electric motors for driving electric power tools and other appliances such as, for example, vacuum cleaners, kitchen machines, food processors, mixers and electric vehicles.

2. Brief Description of the Related Art

Electric motors for use in a wide variety of appliances are well known in the prior art. In contrast to brushed motors, brushless motors can do without a commutator and brushes in sliding contact with the commutator for continuously switching the polarity of the electric windings during operation of the motor. The advantages of brushless motors over brushed motors are high power to weight ratio, high speed, elimination of ionizing sparks from the commutator, and overall reduction of electromagnetic interference (EMI). Brushless motors have an electronic control for switching the polarity of the electric windings. Brushless motors have less friction and longer lifetime (no brush and commutator erosion). Their working life is only limited by the lifetime of their bearings. Brushless motors find applications in such places as computer peripherals (disk drives, printers), hand-held power tools, and vehicles ranging from model aircraft to automobiles, boats and aircraft. A brushless motor for use in electric power tools may be operated with direct current (BLDC) or with an alternating current (BLAC). Electric motors of the outrunner type have the advantage that the internal stator carries the electric windings which can be contacted much easier than if they were rotating.

Since a couple of years, magnetic gear arrangements are also well-known in the prior art. They are primarily used in very large appliances where large forces and torque values have to be transmitted or translated. Magnetic gear arrangements find applications in such places as wind turbines, electric generators of hydroelectric power stations, fluid pumps, in particular in the field of oil and gas exploitation, and cranes. Various embodiments of magnetic gear arrangements have been developed, for example by Magnomatics Ltd., Sheffield, S2 5BQ, United Kingdom; MAG SOAR, 28341 Valdemoro, Madrid, Spain; and Sintex a/s, 9500 Hobro, Denmark. The electric machine described herein includes a so-called coaxial magnetic gear arrangement, where a rotating input element rotates about the same longitudinal axis as an output shaft. The current state of the art is described, for example, in the paper: P. M. Tlali, R-J. Wang and S. Gerber: "Magnetic Gear Technologies: A Review", XXIth International Conference on Electrical Machines (ICEM), Berlin, Germany, Sep. 2-5, 2014.

Electric isolation is a major issue in all types of electric motors, in order to achieve a desired degree of operational safety for the user of an appliance operated by an electric motor. The stator itself or the radially extending anchors, around which the wire coils of the electric windings are wrapped, are always isolated from the rest of the motor, in order to avoid a short circuit and to provide for proper functioning of the motor. However, for some appliances it is desirable to enhance operational safety by providing a better electric isolation (so-called double-isolated electric motors). For example, if high voltages (e.g. 3.750 V and higher) are applied to the electric motor, it must be assured that these do not reach the output shaft and the housing of the appliance operated by the electric motor. For example, as a result of such high voltages an electric arc could be formed between the electric motor and the housing of the appliance and/or the output shaft thereby forming high voltages and/or currents at the housing and/or the output shaft, which could provoke a severe injury of a user operating the appliance. In conventional appliances the formation of electric arcs is avoided by providing air gaps of certain dimensions (e.g. at least 6 mm) or additional electrically isolating material (e.g. plastic, resin) between the electric motor and the housing. However, this leads to rather large dimensions and weight of the appliances. In rather simple appliances the housing is simply made of plastic material, so even if an electric arc is formed between the electric motor and the housing of the appliance, the high voltages and/or currents are not transferred to the user due to the electrically isolating characteristics of the plastic material. However, the output shaft made of metal and/or a working element attached to the output shaft and often made at least partially of metal (e.g. provided with metal inserts) may still be subject to high voltages and/or currents due to the formation of an electric arc between the electric motor and the output shaft. If the user gets in touch with these metal parts, he could be severely injured.

Despite the large number of advantages of electric motors of the outrunner type, one drawback is the fact that cooling of the motor, in particular of its internal electric stator windings, is a challenge. In conventional electric motors, where an internal rotor rotates within an external stator, the circumferential stator walls can simply be provided with cooling openings and/or cooling fins for heat dissipation to the environment surrounding the motor. This is not possible with electric motors of the outrunner type because the internal stator is surrounded by the external rotor encapsulating the stator and thermally separating it from the environment.

SUMMARY OF THE INVENTION

Therefore, it is an object of the present invention to provide for an electric machine which overcomes the above drawbacks. In particular, it is an object to provide for a cost efficient and compact but nonetheless powerful and reliable electric machine having a simple design and which can be effectively cooled. Furthermore, it is desirous to provide for an electric machine of modular design allowing an easy, fast and cost efficient construction of different electric machines for various needs and appliances. Finally, the electric machine should be double-isolated in order to avoid the formation of electric arcs between the electric motor and the housing and/or the output shaft even if high voltages (e.g. 3.750 V and higher) are applied to the electric motor.

The above objects are solved by an electric machine featuring an electric motor and a magnetic gear arrangement. The electric motor is a brushless motor of the so-called outrunner type and includes:

- an internal stator with a first number of electric windings in the form of wire coils disposed circumferentially around a longitudinal axis of the electric machine and
- an external rotor with a second number of permanent magnets of alternating polarities rotatable externally around the stator about the longitudinal axis during operation of the electric motor.

The magnetic gear arrangement is located in a manner displaced along the longitudinal axis in respect to the electric motor and comprises:

a first magnetic element with a third number of permanent magnets, a second magnetic element with a fourth number of permanent magnets, and a modulator comprising a fifth number of ferromagnetic elements disposed between the third number of permanent magnets and the fourth number of permanent magnets, wherein the first magnetic element, the second magnetic element and the modulator are rotatable in respect to each other about the longitudinal axis, wherein one of the elements or the modulator connected to the external rotor of the electric motor in a torque proof manner, and wherein another one of the elements or the modulator is connected to an output shaft of the electric machine in a torque proof manner.

Preferably, the first rotating magnetic element of the magnetic gear arrangement is rotatable about the longitudinal axis and connected to the external rotor of the electric motor in a torque-proof manner, the second rotating magnetic element is rotatable about the longitudinal axis, located internally in respect to the third number of permanent magnets and connected to the output shaft of the electric machine in a torque proof manner, and the modulator is static. The modulator of the magnetic gear arrangement may be connected to the stator of the electric motor.

In particular, it is suggested that the electric machine of the above identified kind is equipped with a venting element which is attached to or forms part of at least one of the rotating parts of the electric machine. The rotating parts comprise the external rotor of the electric motor, the first rotating element and the second rotating element of the magnetic gear arrangement. In that manner, during operation of the electric machine the venting element automatically rotates together with at least one of the rotating parts to which it is attached. The rotating venting element provides for a forced cooling air stream along the components of the electric machine. In this manner, the thermal characteristics of the electric machine are significantly improved.

The electric machine according to the present invention has the advantage that it has very good cooling characteristics. This is particularly important with electric machines using brushless motors because the maximum power that can be applied to a brushless motor is limited almost exclusively by heat; too much heat weakens the magnets of the rotor and will damage the stator winding's insulation. The additional venting element actively creates an air stream for cooling the electric machine, in particular the electric motor, and more particular the internal stator of the motor. The venting element may be designed such that the air stream flows from the environment surrounding the electric machine into the electric machine (the venting element has an aspiration functionality) or from the inside of the electric machine into the environment (the venting element has a blowing functionality). The additional venting element is integrated into the rest of the electric machine and makes an integral part thereof. The venting element may be designed separately from the electric motor and the magnetic gear arrangement. Alternatively, the venting element may be designed in a single part together with one or more parts of the electric motor and/or the magnetic gear arrangement, in which the venting element is integrated in.

Preferably, the venting element is made of an electrically isolating material, in particular a plastic material. In order to provide for a safe attachment of the venting element to the at least one of the rotating parts of the electric machine, it is suggested that the venting element comprises reinforcing metal sections, in particular at least one metal ring, embedded in or surrounding the electrically isolating material of the venting element. To this end, the electric machine has the advantage that the venting element may additionally provide for an electric isolation between the electric motor and the magnetic gear arrangement, in particular the output shaft. Hence, the electric machine can fulfil the requirements of a double-isolated electric machine without the necessity of additional isolating elements (air gaps or isolating material). The electrically isolating material of the venting element is located and dimensioned in such a manner that the formation of electric arcs between the electric motor and the magnetic gear arrangement, in particular the output shaft, can be avoided even if high voltages (3.750 V or higher) are applied to the electric motor.

According to one embodiment of the invention, the venting element is attached to or forms part of the second rotating element of the magnetic gear arrangement, preferably on a surface of the second rotating element facing the electric motor. The rotating venting element creates an air stream running through one or more bearings guiding the output shaft in respect to a static component of the electric machine, through one or more venting openings provided in a bottom plate of the electric machine surrounding the output shaft, through the internal parts of the magnetic gear arrangement, through the internal parts of the electric motor, and/or through venting openings provided in an upper end wall separating the electric motor from the environment.

In this embodiment, the venting element may support the fourth number of permanent magnets of the second rotating element of the gear arrangement. The venting element may be manufactured separately from the second rotating element or as an integral part therewith. In that case, the venting element could be co-moulded together with the fourth number of permanent magnets. The second rotating element and the venting element could form a single common part comprising the fourth number of permanent magnets (affixed to the common part or inserted therein).

According to another embodiment of the invention, the venting element comprises electrically isolating material and is located between the electric motor and the magnetic gear arrangement, thereby electrically isolating the electric motor from the magnetic gear arrangement. Hence, the most crucial parts of the electric machine in terms of electric isolation, that is the electric motor (to which high voltages are applied or where high voltages may occur) and the magnetic gear arrangement (eventually connected to the output shaft of the electric machine) are electrically isolated in respect to one another. This provides for a double-isolated electric machine avoiding the formation of electric arcs between the electric motor and the housing and/or the output shaft even if high voltages (e.g. 3.750 V and higher) are applied to the electric motor.

Further, this embodiment allows an easy realization of a modular design of the electric machine. This can be achieved, for example, by realizing the electric motor, the venting element and the magnetic gear arrangement as separate pre-fabricated devices, which can be attached to one another during manufacturing of the electric machine. For example, in order to obtain an electric machine with a desired output power, a specific electric motor having the desired characteristics (e.g. speed and torque) can be selected from a plurality of electric motors with different characteristics. The desired output power may depend on the appliance, in which the electric machine is used, and/or the gear ratio of the magnetic gear arrangement used. Further, in order to realise a desired degree of cooling of the electric machine, a specific venting element having the desired cooling characteristics (e.g. air volume conveyed per time unit; $m^3/sec$) can be selected from a plurality of venting elements with different cooling characteristics. The desired degree of cooling may depend on the type of electric motor used and/or an external environmental temperature. Finally, in order to realise a desired gear ratio of the magnetic gear arrangement, a specific magnetic gear arrangement having the desired gear ratio can be selected from a plurality of magnetic gear arrangements with different gear ratios. The desired gear ratio may depend on a desired torque value and/or rotational speed of the output shaft.

The selected electric motor, venting element and magnetic gear arrangement are then fixedly attached to one another in order to form the modular electric machine. To this end, it is suggested that the attachment regions of the plurality of electric motors and venting elements on the one hand and of the plurality of venting elements and magnetic gear arrangements on the other hand are identical or at least compatible with one another, in order to allow attachment of any selected electric motor to any selected venting element and of any selected venting element to any selected magnetic gear arrangement.

According to a preferred embodiment of the present invention it is suggested that the venting element is designed as a radial venting element providing for a radial air stream into or out of the electric machine. In particular, it is suggested that the venting element comprises a plurality of venting blades having an extension essentially parallel to the longitudinal axis and with a radial component. Preferably, the venting blades are oriented such that during operation of the electric machine the air stream is drawn radially from the environment surrounding the electric machine into an internal part of the electric machine. Hence, the venting element is advantageously of an aspiration type. Principally, the venting blades may have any desired inclination in order to realise a desired air stream (direction and volume). An inclination of the venting blades may be effected about a first axis running parallel to the longitudinal axis of the electric machine and/or about a second axis running transversely to the longitudinal axis. The venting blades may all have the same inclination or different inclinations. Preferably, in a view along the longitudinal axis, the venting blades have an inclination of over 45° in respect to a radial direction.

The aspirated air stream may be used for cooling the internal part of the entire electric machine, including the electric motor and the magnetic gear arrangement. However, according to a preferred embodiment of the present invention it is suggested that the electric machine has at least one air guiding element which guides a bigger part of the air stream coming from the venting element towards the electric motor or which guides an air flow coming from the electric motor towards the venting element. The air guiding elements may be separate elements provided in the electric machine or they may be parts of the electric motor and/or the magnetic gear arrangement anyway provided in the electric machine. It is possible to locate and/or form those parts of the electric motor and/or the magnetic gear arrangement in a special manner in order to allow them to better fulfil the air guiding functionality. In particular, it is possible to attach a cover plate to the output shaft and/or the second rotating element of the magnetic gear arrangement. The cover plate rotates together with the output shaft. It covers most part of the magnetic gear arrangement and separates it from the venting element, leaving only a small annular air gap between the external circumference of the cover plate and an internal surface of the first rotating element of the magnetic gear arrangement and/or of the venting element.

In order to provide for an efficient airflow through the electric machine, it is suggested that the electric machine comprises an upper end wall separating the electric motor from the environment, with at least one venting opening which opens towards the internal stator of the electric motor. The at least one venting opening allows an air stream to flow from the environment, through the venting element along the internal electric stator windings and through the venting openings back into the environment or vice versa. If a printed circuit board (PCB) for an electric connector and other electric and electronic components of the electric machine is located between the internal stator of the electric motor and the upper end wall, it is suggested that the PCB is equipped with through holes corresponding (in position and size) to the venting openings of the upper end wall. In that case the airflow running through the electric machine would also provide for cooling of the PCB and the electric and electronic components attached thereto.

If a PCB is provided between the electric motor and the upper end wall of the electric machine, it may be desirous that the venting element is designed such that an air stream enters the electric machine through the venting openings of the upper end wall and cools the PCB first before it reaches the internal stator of the electric motor. In that way the sensitive and delicate electric and electronic components of the PCB are cooled with fresh air from the environment before the air is heated up by the internal electric stator windings. Usually, the heat dissipated by the electric and electronic components of the PCB is less than the heat dissipated by the internal electric stator windings.

Furthermore, the electric machine according to the present invention has the advantage that the electric motor has no internal motor shaft because the torque produced by the electric motor is transmitted to the first rotating element of the magnetic gear arrangement and eventually to the output shaft by means of the external rotor. The space, where in conventional electric motors of the inrunner type the motor shaft is located, can be used for other components. To this end it is suggested that the internal stator comprises a central carrier element having an axial extension along the longitudinal axis, to which the first number of radially extending anchors is attached around which the wire coils of the electric windings are wrapped. It is suggested that the central carrier element comprises a venting channel having an axial extension along the longitudinal axis and opening into a central opening in an upper end wall of the electric machine. The cooling channel provides for a direct connection of the venting element with the environment. According to this embodiment, the space where in conventional electric motors the internal motor shaft is located, is used for achieving an additional cooling effect. Part of the cooling air stream conveyed by the venting element will flow through the venting channel of the central carrier element. Heat created during operation of the electric motor in the wire coils of the electric windings is directly transmitted to the anchors by thermal conduction and further to the central carrier element. At least some of the heat is then transferred to the air flowing through the venting channel and is dissipated into the environment. This embodiment provides for an additional internal cooling of the stator of the electric motor, which supplements the external cooling of the stator achieved by means of the airflow running along the wire coils of the electric windings, in order to achieve a particularly efficient cooling of the electric motor.

According to a particularly preferred embodiment of the invention, it is suggested that the venting element is located between the external rotor of the electric motor and the first rotating element of the magnetic gear arrangement, preferably fixed to the external rotor of the electric motor and/or to the first rotating element of the magnetic gear arrangement in a torque proof manner. In this embodiment the venting element does not require a separate drive, but is automatically driven together with the external rotor of the electric motor during operation of the electric machine. The rotation of the venting element is transmitted to the first rotating element of the magnetic gear arrangement. Furthermore, the rotational speed of the venting element is automatically adjusted to the required amount of cooling: The faster the electric machine is operated, the more heat is generated by the electric machine, in particular by the current running through the wire coils of the electric windings of the internal stator of the electric motor. With the increasing speed of the electric machine the venting element is rotated faster together with the external rotor of the electric motor thereby creating a stronger airflow (larger air volume per time unit; $m^3/sec$).

Preferably, the electrically isolating material of the venting element is a plastic material. A venting element comprising plastic material can be easily and cheaply manufactured, for example by injection moulding. Plastic material has very good electrically isolating characteristics, is durable, strong and light in weight. Alternatively, the electrically isolating material could also be any kind of resin.

It is further suggested that the venting element has reinforcing metal sections, in particular at least one metal ring, embedded in or surrounding the electrically isolating material of the venting element, for safe attachment of the venting element to the external rotor of the electric motor and/or to the first rotating element of the magnetic gear arrangement. The reinforcing metal sections are preferably provided at the attachment regions of the venting element, with which it is attached to the external rotor and the first rotating element. The venting element comprising the electrically isolating material and the reinforcing metal sections is preferably manufactured by co-moulding. In particular, metal rings could be co-moulded into a plastic material of the venting element for reinforcing the venting element at the attachment regions. The venting element could be fixedly attached to the external rotor and/or the first rotating element by means of a press-fit connection or a snap-lock connection. Additionally, blocking elements could be provided, interacting between the venting element and the external rotor and/or between the venting element and the first rotating element, in order to prevent the rotational displacement of the venting element about the longitudinal axis in respect to the external rotor and/or the first rotating element. The blocking elements could comprise, for example, one or more protrusions (e.g. pins) interacting with respective depressions (e.g. holes).

According to a preferred embodiment, the venting element supports the third number of permanent magnets of the first rotating element of the gear arrangement. The third number of permanent magnets may be integrated in the venting element or may be formed separately from the venting element and attached thereto. For example, it could be possible that the venting element and the first rotating element are one and the same part provided with a third number of receiving sections (e.g. depressions) into which the permanent magnets of the first rotating element may be inserted. Alternatively, it could be possible that the third number of permanent magnets are held between a part of the venting element facing the magnetic gear arrangement and a part of the first rotating element of the magnetic gear arrangement facing the venting element. By fixedly attaching the venting element to the first rotating element of the magnetic gear arrangement the permanent magnets of the first rotating element are held (e.g. clamped) in their respective positions.

A typical brushless DC motor has permanent magnets which rotate around a fixed armature, eliminating problems associated with connecting current to the moving armature. An electronic controller replaces the brush/commutator assembly of the brushed DC motor, which continually switches the phase to the windings to keep the motor turning. The controller performs similar timed electric power distribution by using a solid-state circuit with semiconductor switches such as transistors rather than the brush/commutator system. Brushless motor commutation can be implemented in software using a microcontroller or microprocessor computer, or may alternatively be implemented in analogue hardware, or in digital firmware using an FPGA.

Commutation with electronics instead of brushes allows for greater flexibility and capabilities not available with brushed DC motors, including speed limiting, and a holding torque when stationary. In order to achieve the electronic commutation, the electronic controller requires information in respect to the current rotational position (angle) of the rotor. The angular information can be deduced from electric values (e.g. voltage curve, current curve) of the motor without the use of dedicated angular sensors. However, this requires an electronic controller with a microprocessor which operates at a very high clock rate, which increases with the rotational speed of the electric motor and, hence, with the rate at which the polarities of the electric stator windings are switched.

Therefore, according to a preferred embodiment of the present invention, it is suggested that the electric machine comprises at least one first contactless position detection sensor for determining a rotational position (angle) of the external rotor of the electric motor in respect to the internal stator. By detecting the current angle of the rotor by means of a sensor, an electronic controller with a microprocessor operating at a lower clock rate can be used for the commutation. The sensor is preferably embodied as a Hall-sensor. The sensor is preferably attached to the internal stator or another static component of the electric machine, which makes it particularly easy to contact for providing electric energy (e.g. an electric current) to the sensor and for tapping a sensor signal (e.g. an electric voltage) created by the sensor during operation of the electric machine. The use of the sensor allows a precise, safe and reliable switching of the polarities of the electric stator windings.

Furthermore, it is suggested that the electric machine comprises at least one second contactless position detection sensor for determining a rotational position (speed) of the second rotating element of the gear transmission and/or of the output shaft of the electric machine. From the detected positions over time the speed can be determined. By detecting the rotational speed of the output shaft by means of a sensor, an electronic controller of the electric machine can control the speed by means of a closed loop control in order to maintain the speed of the output shaft constantly at a desired value independent of external influences (e.g. the requested load or torque value). The sensor is preferably embodied as a Hall-sensor. The sensor is preferably attached to the static modulator of the magnetic gear arrangement or any other static component of the electric machine, which makes it particularly easy to contact for providing electric energy (e.g. an electric current) to the sensor and for tapping a sensor signal (e.g. an electric voltage) created by the sensor during operation of the electric machine. The use of the sensor allows a precise, safe and reliable operation of the electric machine keeping the speed of the output shaft at a desired constant value irrespective of external influences.

The electric machine according to the present invention has the above-identified advantageous in particular when used in an electric power tool comprising a housing and an electric motor and a magnetic gear arrangement both located within the housing, and further comprising an output shaft to which a working element can be attached. The electric motor and the magnetic gear arrangement of the power tool form part of an electric machine according to the present invention. The power tool is particularly calm during operation (a result of low vibrations and low noise of the electric machine), small in dimensions and light in weight (a result of the highly integrated, compact and lightweight electric machine), powerful (a result of the overall design of the electric machine, including the enhanced cooling of the electric motor, allowing an efficient operation) and safe (a result of the double-insulated design of the electric machine). Preferably, the electric power tool is one of a sander, a polisher, a grinder, a drill, a percussion drill and an electric screwdriver. Preferably, the working element performs one of a purely rotational, a random-orbital a roto-orbital (gear driven) and a purely orbital working movement.

Further characteristics and advantages of the present invention are described hereinafter in more detail, thereby referring to the enclosed drawings. The drawings show:

BRIEF DESCRIPTION OF THE DRAWING

The drawing includes FIGS. 1-12, as follows.

FIG. 12 a third preferred embodiment of an electric machine according to the present invention in a sectional view.

DETAILED DESCRIPTION OF THE INVENTION

Figure 1:
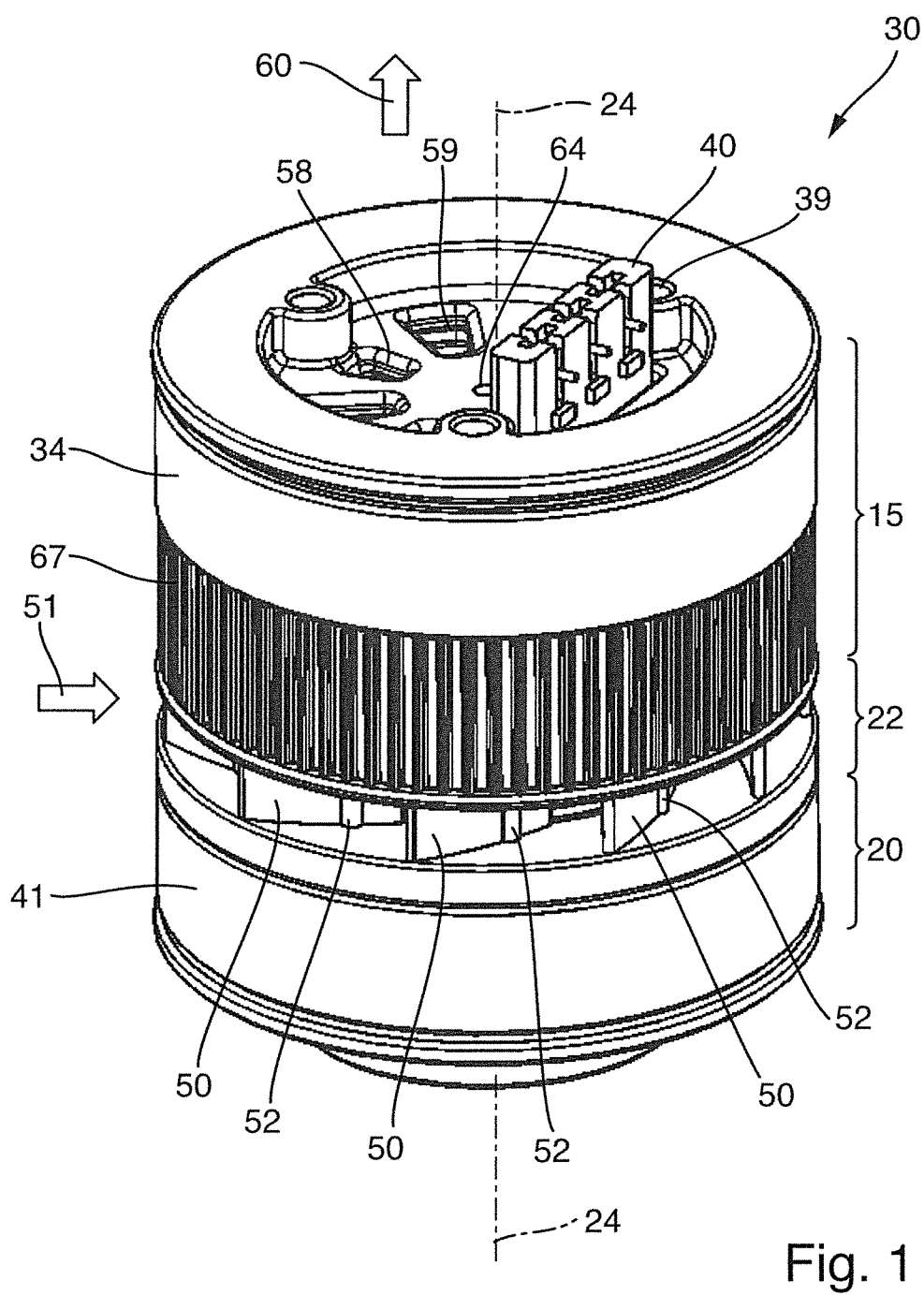
FIG. 1 a preferred embodiment of an electric machine according to the present invention in a perspective view.
Figure 2:
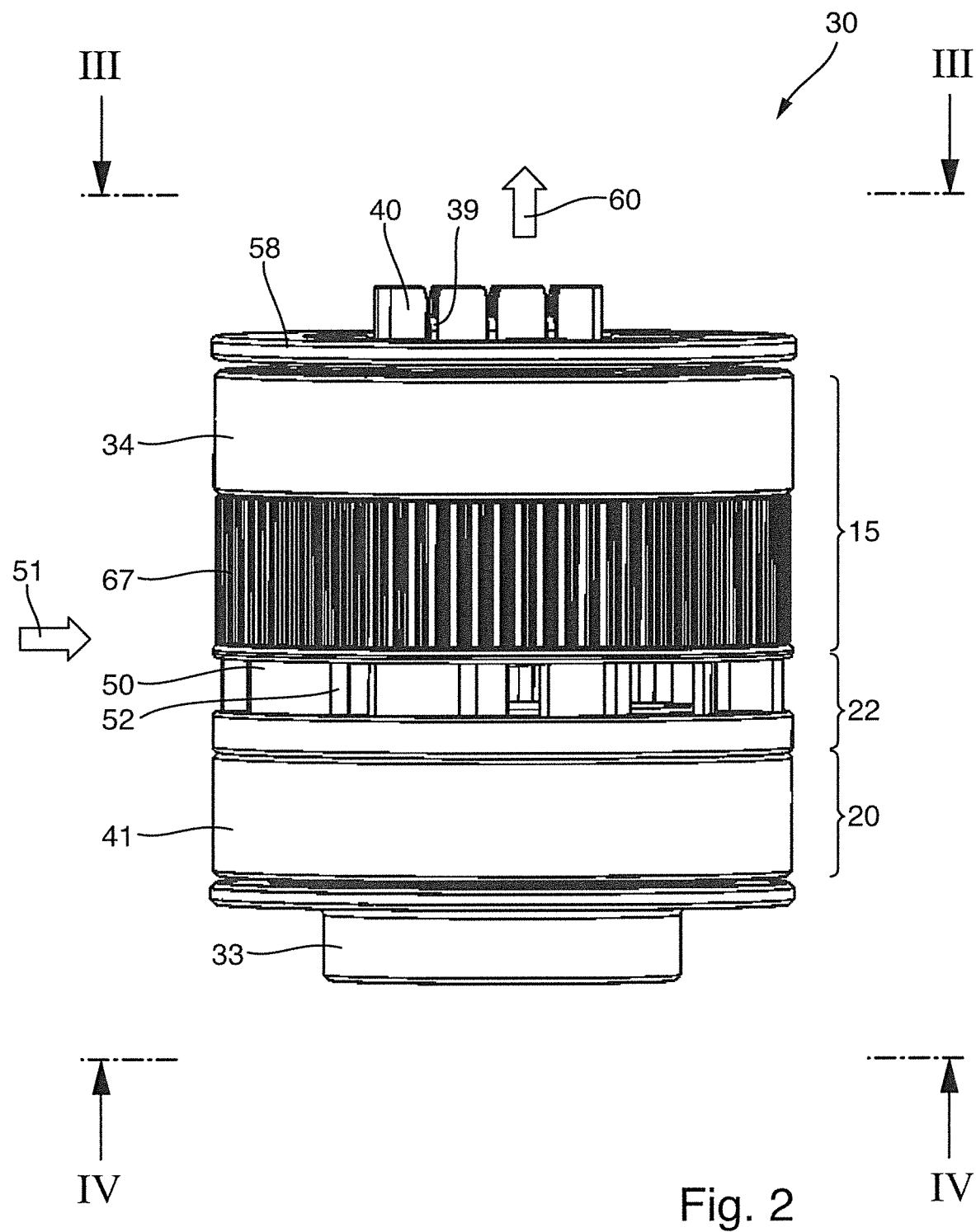
FIG. 2 the electric machine of FIG. 1 in a side view.
Figure 3:
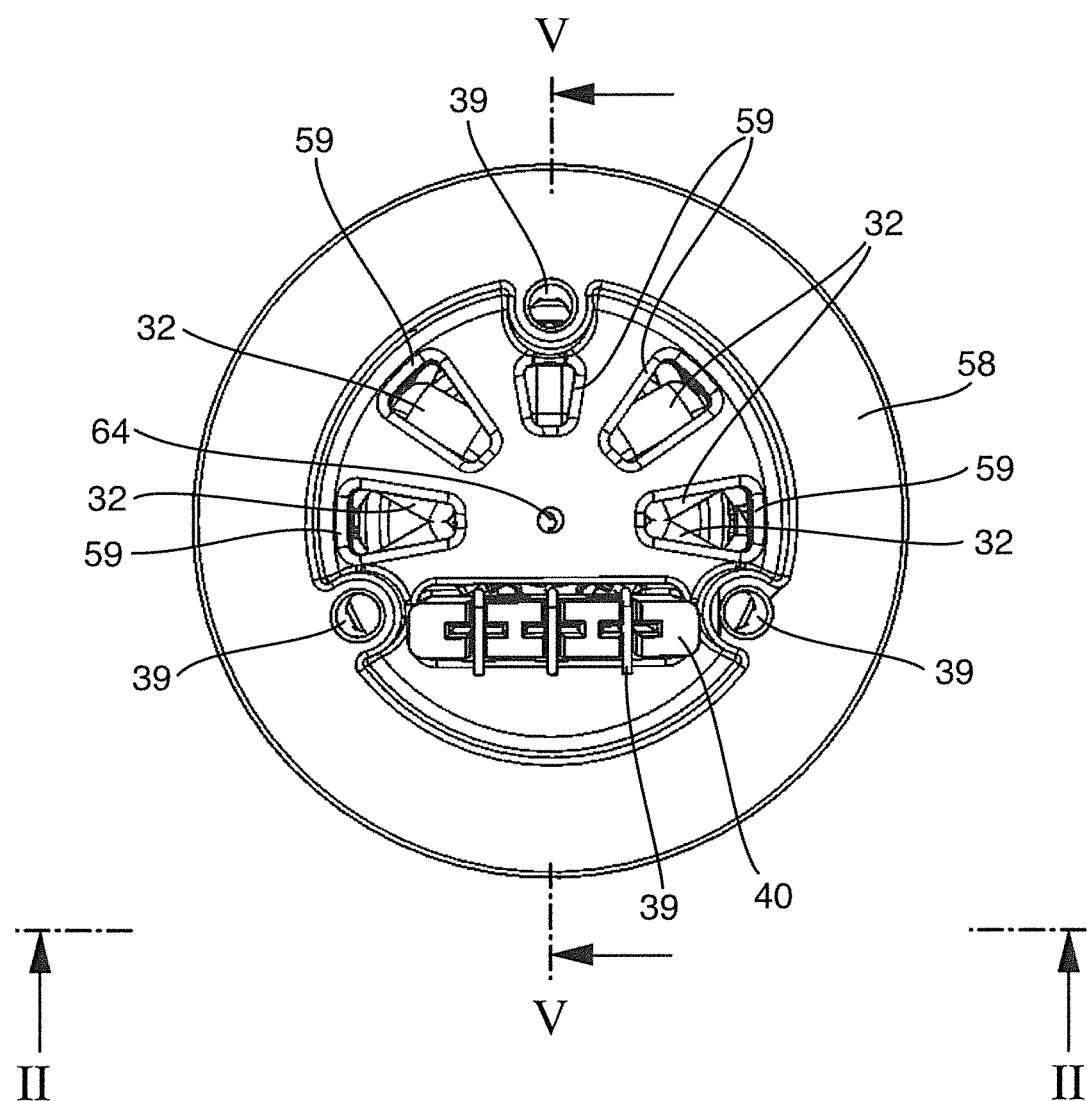
FIG. 3 the electric machine of FIG. 1 in a top view.
Figure 4:
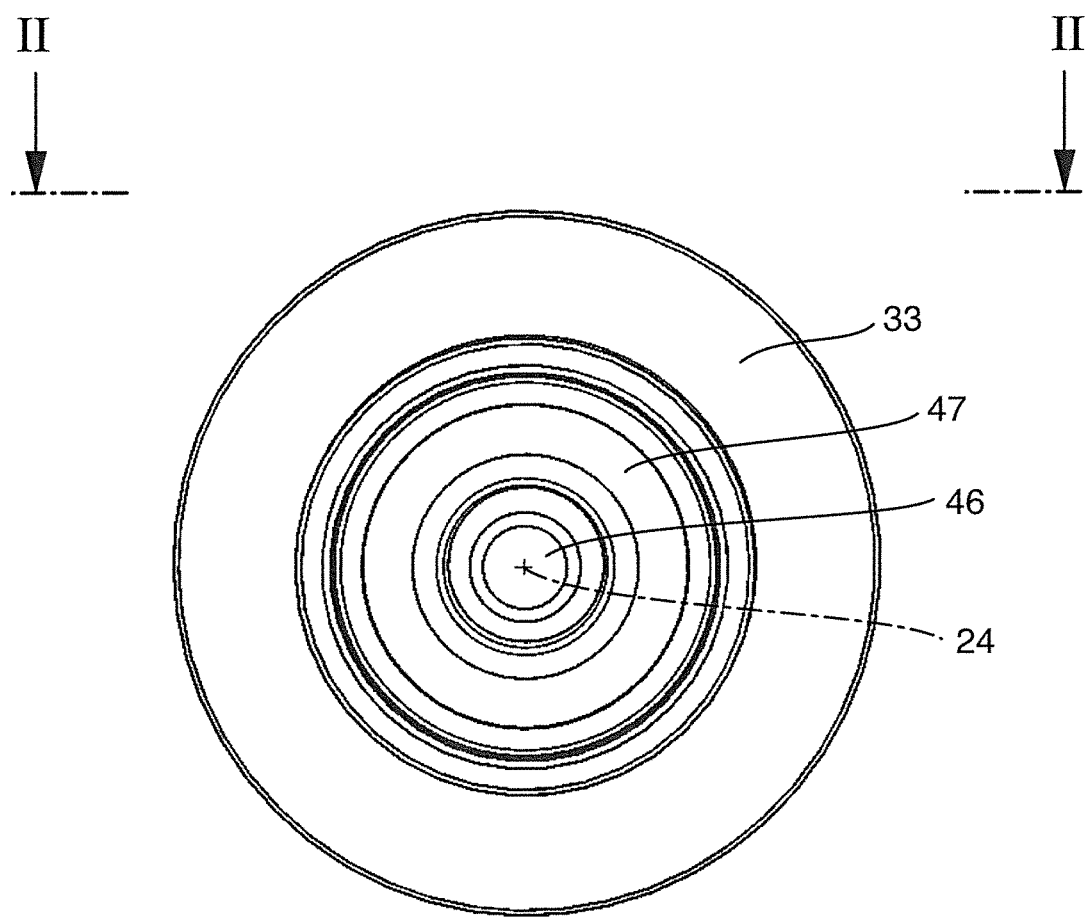
FIG. 4 the electric machine of FIG. 1 in a bottom view.

FIG. 1 shows a preferred embodiment of an electric machine 30 according to the present invention in a perspective view. The electric machine 30 comprises a longitudinal axis 24, along the extension of which are located an electric motor 15, a venting element 22 and a magnetic gear arrangement 20.

Figure 5:
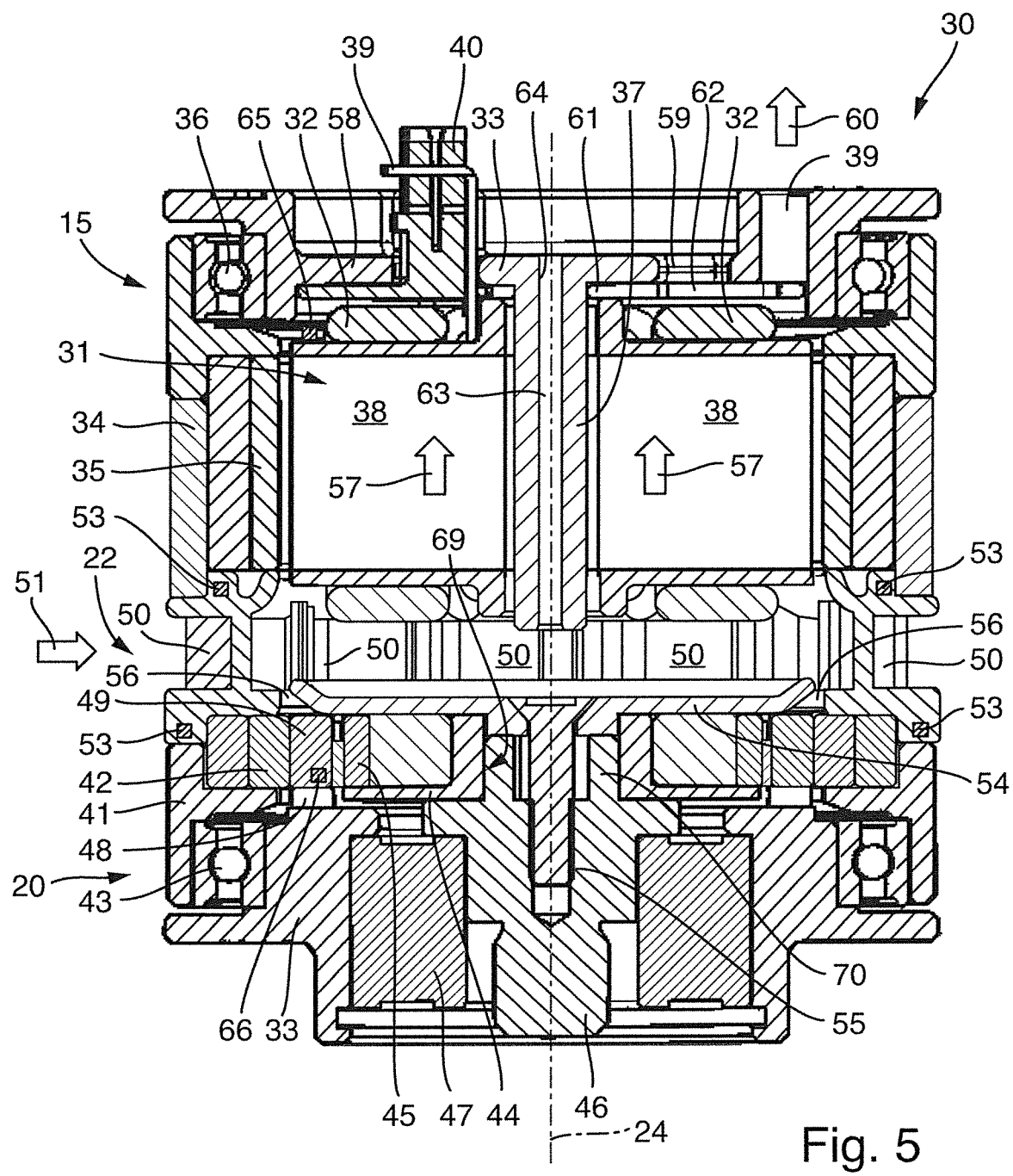
FIG. 5 the electric machine of FIGS. 1-4 in a sectional view.
Figure 8:
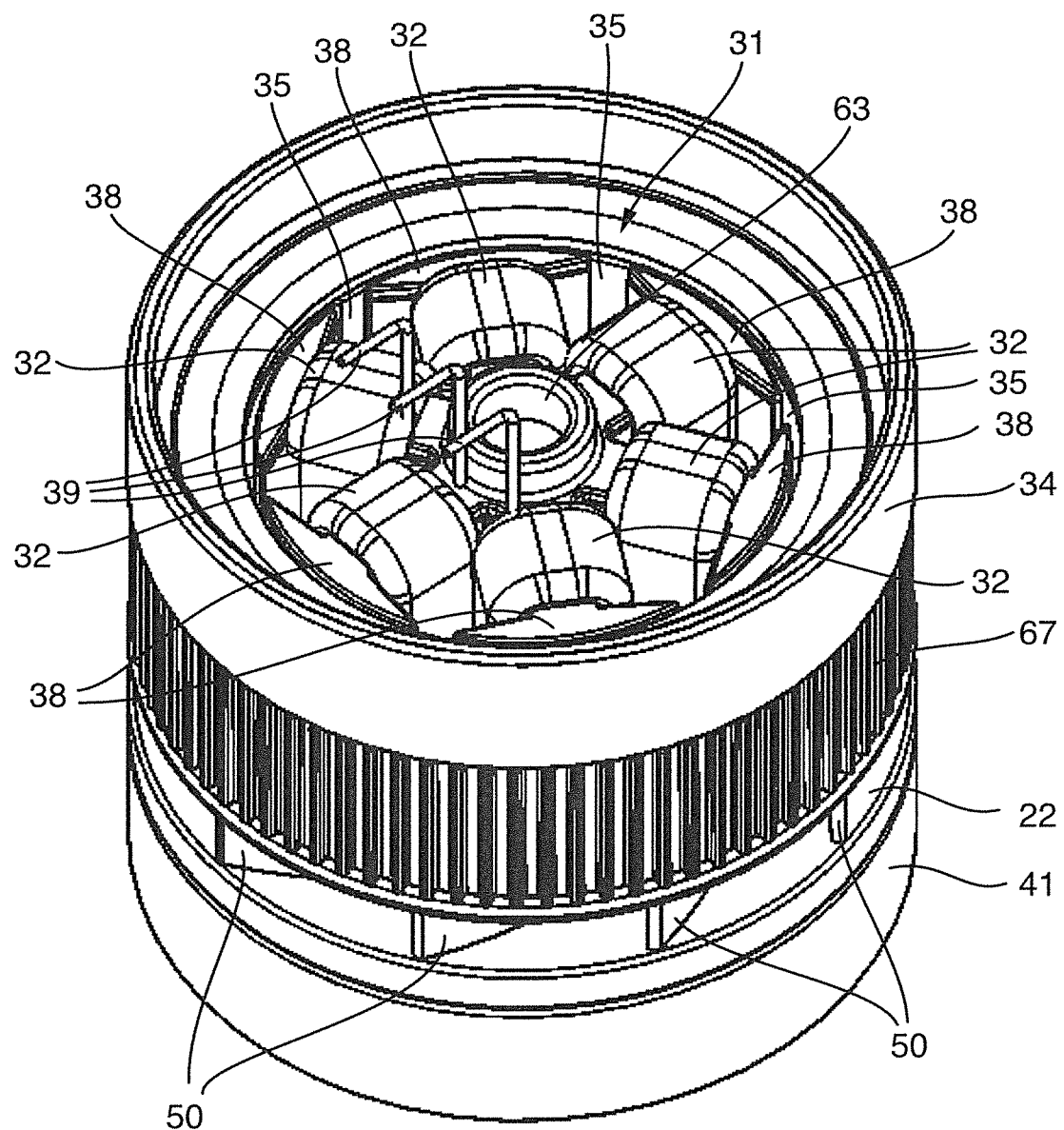
FIG. 8 the unit shown in FIG. 6 together with an internal rotor of the electric motor in a perspective view.

The electric motor 15 may be an alternating current (AC) or a direct current (DC) motor. It is a brushless motor of the so-called outrunner type and comprises an internal stator 31 (see FIGS. 5 and 8) with a first number of electric windings 32 in the form of wire coils disposed circumferentially around the longitudinal axis 24 of the electric machine 30. The stator 31 is connected to or forms part of a static component 33 of the electric machine 30. The stator 31 comprises a central carrier element 37 connected to or forming part of the static component 33. The carrier element 37 has an axial extension along the longitudinal axis 24. A first number of radially extending anchors 38 is attached to the carrier element 37. The wire coils of the electric windings 32 are wrapped around these anchors 38. End wires 39 of the electric windings 32 all end in an electric connector 40, which is provided with a total of three electric contacts, one for each of three phases of the electric motor 15. The electric motor 15 further comprises an external rotor 34 with a second number of permanent magnets 35 of polarities alternating in a circumferential direction. The rotor 34 rotates externally around the stator 31 about the longitudinal axis 24 during operation of the electric motor 15. Ball bearings 36 are provided between the static component 33 and the rotor 34. The ball bearings 36 may be part of a bearing ring or ball race. In this embodiment, the electric machine 30 is provided with a total of six electric windings 32 and with a total of four permanent magnets 35. However, different numbers of electric windings 32 and permanent magnets 35 can be chosen depending on the individual requirements.

The magnetic gear arrangement 20 is located in a manner displaced along the longitudinal axis 24 in respect to the electric motor 15. The magnetic gear arrangement 20 comprises a first rotating element 41 with a third number of permanent magnets 42 rotatable about the longitudinal axis 24 and indirectly connected to the external rotor 34 of the electric motor 15 by means of the venting element 22 in a torque-proof manner. Ball bearings 43 are provided between the static component 33 and the first rotating element 41. The ball bearings 43 may be part of a bearing ring or ball race. Furthermore, the magnetic gear arrangement 20 comprises a second rotating element 44 with a fourth number of permanent magnets 45 located internally in respect to the third number of permanent magnets 42. The second rotating element 44 can also rotate about the longitudinal axis 24 and is connected to an output shaft 46 of the electric machine 30 in a torque proof manner. Preferably, the output shaft 46 is provided with an external thread. Ball bearings 47 are provided between the static component 33 and the second rotating element 44. The ball bearings 47 may be part of a bearing ring or ball race. Further, the magnetic gear arrangement 20 comprises a static modulator 48 comprising a fifth number of ferromagnetic elements 49 disposed between the third number of permanent magnets 42 and the fourth number of permanent magnets 45. The modulator 48 is connected to or forms part of the static component 33.

The polarities of the third and fourth number of permanent magnets 42, 45 alternate in a circumferential direction. In order to achieve a desired gear ratio differing from 1:1, the third number of permanent magnets 42 differs from the fourth number of permanent magnets 45. In this embodiment the magnetic gear arrangement 20 is provided with a total of four permanent magnets 42 of the first rotating element 41, two with positive polarity and two with negative polarity, and with a total of ten permanent magnets 45 of the second rotating element 44, five with positive polarity and five with negative polarity. Further, the static modulator 48 comprises a total of seven ferromagnetic elements 49. However, different numbers of permanent magnets 42 and permanent magnets 45 can be chosen depending on the individual requirements. The same applies for the number of ferromagnetic elements 49 of the static modulator 48, which depending on the individual requirements can differ from seven. In this embodiment the first rotating element 41 rotates faster than the second rotating element 44. Hence, the magnetic gear transmission 20 leads to a reduction of the rotational speed of the output shaft 46 (the output shaft 46 rotates slower than the rotor 34 of the motor 15) and to an increase of the torque which can be applied by the output shaft 46.

According to the present invention the venting element 22 is located between the electric motor 15 and the magnetic gear arrangement 20. The venting element 22 comprises electrically isolating material, e.g. plastic or resin, and electrically isolates the electric motor 15 from the magnetic gear arrangement 20 and the output shaft 46, respectively. A plastic venting element 22 can be easily and cheaply manufactured, for example by injection moulding. The venting element 22 also rotates about the longitudinal axis 24. Preferably, the venting element 22 is located between the external rotor 34 of the electric motor 15 and the first rotating element 41 of the magnetic gear arrangement 20 and rotates together with these parts. The venting element 22 is fixed to the external rotor 34 and to the first rotating element 41 in a torque proof manner.

Figure 6:
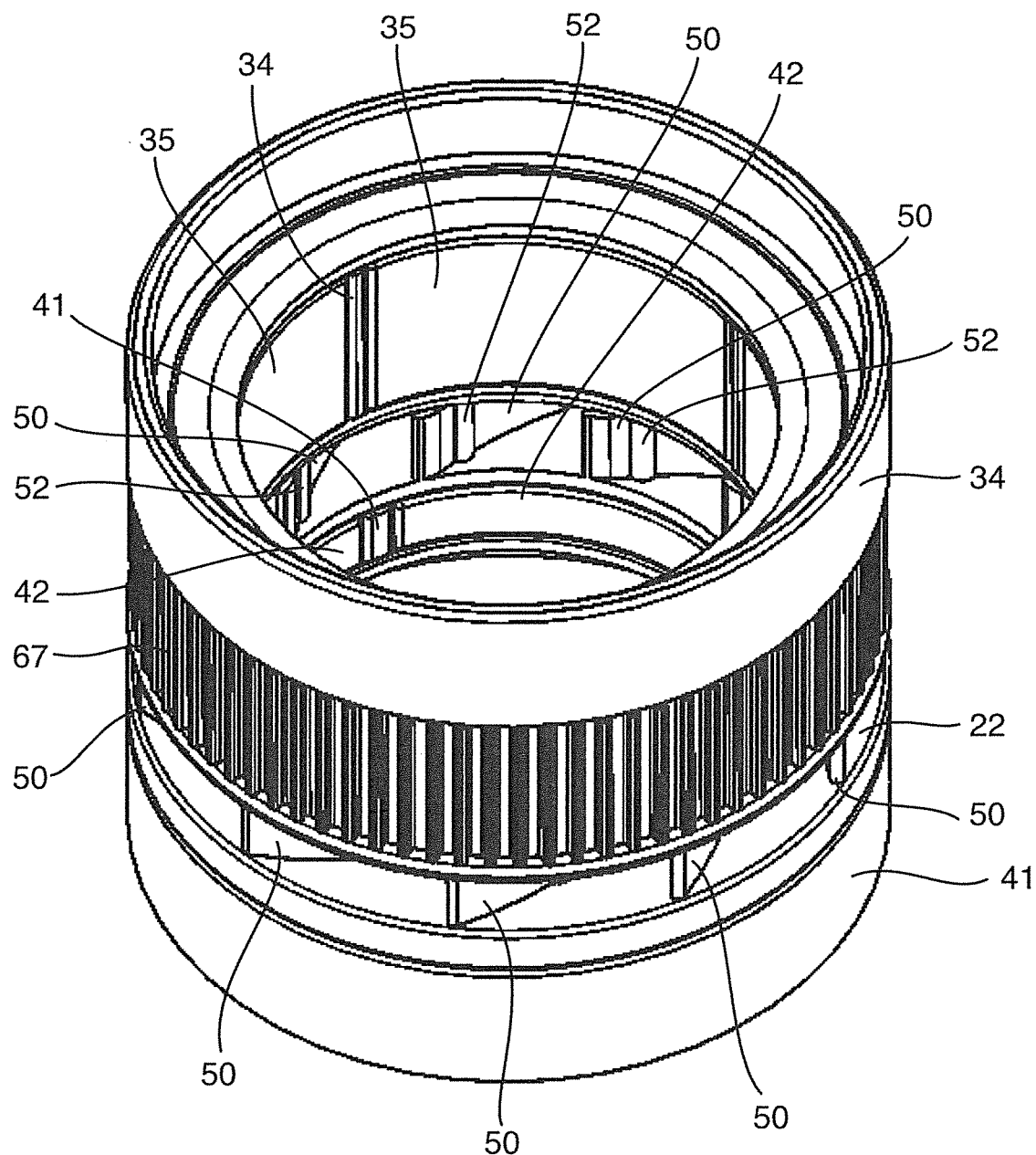
FIG. 6 a fast rotating unit of the electric machine of FIGS. 1-5 in a perspective view.

The venting element 22 is designed as a radial venting element providing for a radial air stream 51 into or out of the electric machine 30. It is provided with a plurality of venting blades 50 having an extension essentially parallel to the longitudinal axis 24 and with a radial component. In this embodiment the venting blades 50 are oriented such that during operation of the electric machine 30 and rotation in a given direction about the axis 24 an air stream 51 is drawn radially from the environment surrounding the electric machine 30 into an internal part of the electric machine 30. Preferably, in a view along the longitudinal axis 24, the venting blades 50 have an inclination of over 45° in respect to a radial direction (see FIGS. 1 and 6). Of course, the orientation of the venting blades 50 can be modified in order to provide for an air stream 51 according to desired characteristics in term of direction and conveyed air volume. The venting blades 50 can have an even or plane extension or they can be curved about individual axes running parallel in respect to the longitudinal axis 24. The venting blades 50 can be provided with a reinforcing structure 52 (see FIG. 1).

Due to the venting element 22 the electric machine 30 has very good cooling characteristics. The additional venting element 22 actively creates an air stream 51 for cooling the electric machine 30, in particular the electric motor 15, and more particular the internal stator 31 of the motor 15 with its electric stator windings 32. Preferably, the venting element 22 has reinforcing metal sections 53, in particular at least one metal ring, embedded in or surrounding the electrically isolating material of the venting element 22, for safe attachment of the venting element 22 to the external rotor 34 of the electric motor 15 and/or to the first rotating element 41 of the magnetic gear arrangement 20. To this end, the metal sections 53 are provided in attachment regions of the venting element 22, where it is attached to the external rotor 34 and/or the first rotating element 41. The venting element 22 comprising the electrically isolating material and the reinforcing metal sections 53 is preferably manufactured by co-moulding. The venting element 22 could be fixedly attached to the external rotor 34 and/or the first rotating element 41 by means of a press-fit connection or a snap-lock connection. Additionally, blocking elements (not shown) could be provided interacting between the venting element 22 and the external rotor 34 and/or between the venting element 22 and the first rotating element 41, in order to prevent a rotational displacement of the venting element 22 about the longitudinal axis 24 in respect to the external rotor 34 and/or the first rotating element 41. The blocking elements could comprise, for example, one or more protrusions (e.g. pins) interacting with respective depressions (e.g. holes).

Additionally, the electric machine 30 has the advantage that the venting element 22 also provides for an electric isolation between the electric motor 15 and the magnetic gear arrangement 20 and the output shaft 46, respectively. Hence, the electric machine 30 can fulfil the requirements of a double-isolated electric machine without the necessity of additional isolating elements. The electrically isolating material of the venting element 22 is located and dimensioned such that the formation of electric arcs between the electric motor 15 and the magnetic gear arrangement 20, in particular the output shaft 46, is prevented even if in exceptional cases high voltages (3.750 V or higher) are applied to the electric motor 15 by accident or for reasons of malfunction or defects of the electric machine 30.

Finally, a modular design can be easily realised with the electric machine 30. This can be achieved, for example, by realizing the electric motor 15, the venting element 22 and the magnetic gear arrangement 20 as separate devices, which can be fixedly attached to one another during manufacturing of the electric machine 30. For example, in order to obtain an electric machine 30 with a desired output power, a specific electric motor 15 having the desired characteristics can be selected from a plurality of available electric motors with different characteristics. The desired output power may depend on the appliance, in which the electric machine 30 is used, and/or the gear ratio of the magnetic gear arrangement 20 used. Further, in order to realise a desired degree of cooling of the electric machine 30, a specific venting element 22 having the desired cooling characteristics can be selected from a plurality of available venting elements with different cooling characteristics. The desired degree of cooling may depend on the type of electric motor 15 used and/or an external environmental temperature. Finally, in order to realise a desired gear ratio of the magnetic gear arrangement 20, a specific magnetic gear arrangement 20 having the desired gear ratio can be selected from a plurality of available magnetic gear arrangements with different gear ratios. The desired gear ratio may depend on a desired torque value and/or rotational speed of the output shaft 46.

The selected electric motor 15, venting element 22 and magnetic gear arrangement 20 are then fixedly attached to one another in order to form the modular electric machine 30. To this end, it is suggested that the attachment regions between the plurality of electric motors 15 and venting elements 22 on the one hand and between the plurality of venting elements 22 and magnetic gear arrangements 20 on the other hand are compatible with one another, in order to allow attachment of any selected electric motor 15 to any selected venting element 22 and of any selected venting element 22 to any selected magnetic gear arrangement 20.

The aspirated air stream 51 may be used for cooling the internal part of the entire electric machine 30, including the electric motor 15 and the magnetic gear arrangement 20.

Preferably, the electric machine 30 has air guiding elements which guide a bigger part (airflow 57) of the air stream 51 coming from the venting element 22 towards the electric motor 15. In the present embodiment a cover plate 54 is used as an air guiding element. It covers most part of the magnetic gear arrangement 20 thereby separating it from the venting element 22, leaving only a small annular air gap 56 between an outer circumference of the cover plate 54 and an internal surface of a lower part of the venting element 22 directed towards the magnetic gear arrangement 20. The cover plate 54 is attached to the output shaft 46 by means of a central screw 55 and rotates together with the second rotating element 44 of the magnetic gear arrangement 20. The cover plate 54 guides the bigger part 57 of the air stream 51 coming from the venting element 22 towards the electric motor 15 and in particular along the electric stator windings 32.

In order to provide for an efficient airflow 57 through the electric machine 30, it is suggested that the electric machine 30 comprises an upper end wall 58 separating the electric motor 15 from the environment, with at least one venting opening 59 which opens towards the internal stator 31 of the electric motor 15. The venting openings 59 allow an air stream 51 to flow from the environment, through the venting element 22 along the internal electric stator windings 32 and through the venting openings 59 as air stream 60 back into the environment or vice versa. If a printed circuit board (PCB) 61 for the electric connector 40 and other electric and electronic components (not shown), e.g. a microprocessor, of the electric machine 30 is located between the internal stator 31 of the electric motor 15 and the upper end wall 58, it is suggested that the PCB 61 is equipped with through holes 62 corresponding in position and size to the venting openings 59 of the upper end wall 58. The airflow 57 running through the electric machine 30 also provides for cooling of the PCB 61 and the electric and electronic components attached thereto.

The electric motor 15 has no internal motor shaft because the torque produced by the electric motor 15 is transmitted by means of the external rotor 34. The space, where in conventional electric motors the internal motor shaft is located, can be used for other components. To this end the internal stator 31 comprises the central carrier element 37 which comprises a venting channel 63 with a longitudinal extension along the longitudinal axis 24 and leading into a central opening 64 in the upper end wall 58 of the electric machine 30. Hence, an additional internal cooling effect is achieved. Part of the cooling airflow 57 provoked by the venting element 22 will flow through the venting channel 63 of the central carrier element 37. Heat created in the wire coils of the electric windings 32 during operation of the electric motor 15 is directly transferred to the anchors 38 and further to the central carrier element 37 by thermal conduction. At least some of the heat is then transferred to the air flowing through the venting channel 63 and dissipated into the environment through the opening 64. The additional internal cooling of the electric stator 31 of the electric motor 15 supplements the external cooling of the stator 31 achieved by means of the airflow 57 running along the wire coils of the electric windings 32, thereby achieving a particularly efficient cooling of the electric motor 15.

The venting element 22 may support the third number of permanent magnets 42 of the first rotating element 41 of the magnetic gear arrangement 20. The third number of permanent magnets 42 may be integrated in the venting element 22 (e.g. by co-moulding) or they may be formed separately from the venting element 22 and attached thereto. It could also be possible that the venting element 22 and the first rotating element 41 are one and the same part provided with a third number of receiving sections into which the permanent magnets 42 of the first rotating element 41 are inserted. Alternatively, it could be possible that the third number of permanent magnets 42 of the first rotating element 41 are held between a part of the venting element 22 directed towards the magnetic gear arrangement 20 and a part of the first rotating element 41 of the magnetic gear arrangement 20 facing the venting element 22. By fixedly attaching the venting element 22 to the first rotating element 41, the permanent magnets 42 are held (e.g. clamped) in their respective positions.

The electric motor 15 has permanent magnets 35 which rotate around the fixed stator 31, eliminating problems associated with connecting current to a moving stator. An electronic controller (e.g. provided on the PCB 61 or externally) replaces the brush/commutator assembly of a brushed DC motor and continually switches the phase to the windings 32 to keep the motor 15 turning. The controller performs similar timed electric power distribution by using a solid-state circuit with semiconductor switches such as transistors rather than the brush/commutator system. In order to achieve the electronic commutation, the electronic controller requires information in respect to the current rotational position (angle) of the rotor 34. The angular information can be deduced from electric values (e.g. voltage curve, current curve) of the motor 15 without the use of dedicated angular sensors. However, this requires an electronic controller with a microprocessor which operates at a very high clock rate. The required clock rate increases with the rotational speed of the electric motor 15 and the rate at which the polarities of the electric stator windings 32 are switched.

Therefore, it is suggested that the electric machine 30 comprises at least one first contactless position detection sensor 65 for determining a rotational position (angle) of the external rotor 34 of the electric motor 15 in respect to the internal stator 31. By detecting the current angle of the rotor 34 by means of a sensor 65, an electronic controller with a microprocessor which operates at a lower clock rate can be used for the commutation. The sensor 65 is preferably embodied as a Hall-sensor. When a current flows through a Hall sensor, it delivers a voltage transversely to the current flow through the action of a perpendicular magnetic field. In the present case the Hall-sensor 65 can deliver a voltage through the action of the magnetic field created by the permanent magnets 35, thereby allowing detection of the angular position of the permanent magnets 35 and of the rotor 34. The sensor 65 is preferably attached to the static component 33 or the internal stator 31 of the motor 15, which makes it particularly easy to contact in order to provide electric energy (e.g. an electric current) to the sensor 65 and to tap a sensor signal (e.g. an electric voltage) created by the sensor 65 during operation of the electric machine 30. Of course, it would also be possible to use bearings 36 which have a contactless position detection sensor integrated therein. The use of the sensor 65 provides for a precise, safe and reliable switching of the polarities of the electric stator windings 32 for operation of the electric machine 30.

Furthermore, it is suggested that the electric machine 30 comprises at least one second contactless position detection sensor 66 for determining a rotational position of the second rotating element 44 of the gear transmission 20 and/or of the output shaft 46 of the electric machine 30 in respect to the static component 33. From the current position over time a rotational speed can be determined. By detecting the current speed of the output shaft 46 with the sensor 66, an electronic controller of the electric machine 30 can control the speed of the output shaft 46 by means of a closed loop control in order to maintain it constantly at a desired value independent of external influences (e.g. a requested load or torque value). The sensor 66 is preferably embodied as a Hall-sensor. The sensor 66 may detect the magnetic field created by the permanent magnets 45 of the second rotating element 44. The sensor 66 is preferably attached to the static component 33 or the static modulator 49 of the magnetic gear arrangement 20, which makes it particularly easy to contact for providing electric energy (e.g. an electric current) to the sensor 66 and for tapping a sensor signal (e.g. an electric voltage) created by the sensor 66 during operation of the electric machine 30. The use of the sensor 66 allows a precise, safe and reliable operation of the electric machine 30 keeping the speed of the output shaft 46 at a desired constant value irrespective of external influences.

It is suggested that the rotor 34 of the electric motor 15 is made of metal, e.g. aluminium. At least part of its external surface may be provided with fins 67 (see FIG. 1) preferably extending parallel to the longitudinal axis 24. These fins 67 increase the external surface area of the rotor 34, thereby providing for an enhanced cooling effect. Further, during operation of the electric machine 30 the fins 67 rotate together with the rotor 34 and create air turmoils in the environment surrounding the electric machine 30. This avoids accumulation of hot air in a housing of an appliance in which the electric machine 30 is used, for example in the housing 2 of a power tool 1 (see FIGS. 9 and 10). These air turmoils provide for a better exchange of the air contained in the housing and for a more efficient cooling of the electric machine 30.

Further, it is suggested that the first rotating part 41 of the magnetic gear arrangement 20 is made of metal, e.g. aluminium. The venting element 22 is preferably made of a plastic material with reinforcing metal inserts 53 in its attachment regions where it is attached to the rotor 34 and the first rotating part 41. The second rotating part 44 of the magnetic gear arrangement 20 is preferably made of a plastic material. The output shaft 46 is preferably made of metal, e.g. aluminium. The static component 33 is preferably made of metal, e.g. aluminium. The cover plate 54 is preferably made of a plastic material. The second rotating part 44 of the magnetic gear arrangement 20 and the cover plate 54 could be realized as one and the same component.

Figure 7:
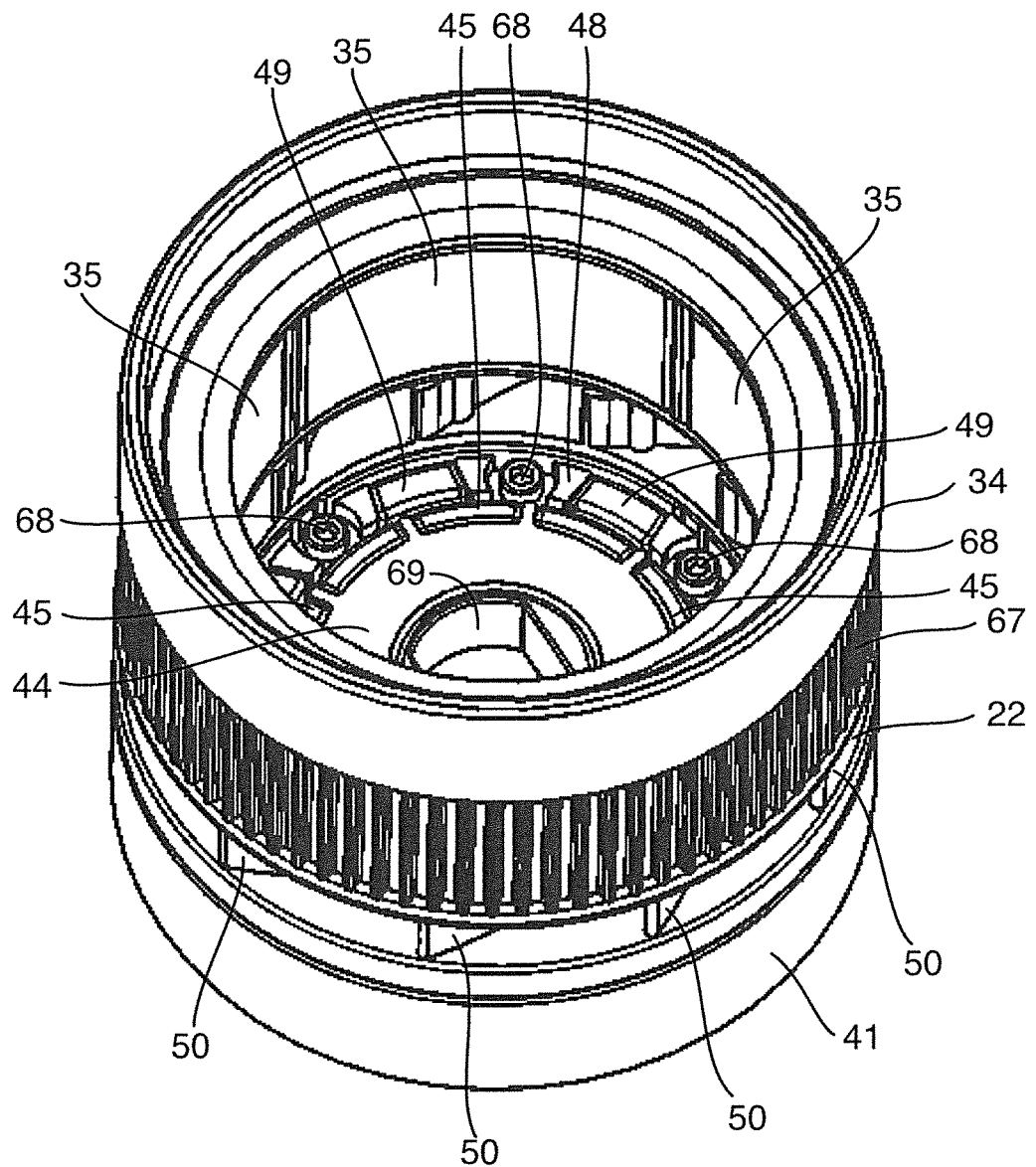
FIG. 7 the unit shown in FIG. 6 together with a second rotating element and a static modulator of a magnetic gear arrangement in a perspective view.

The static modulator 48 is preferably attached to the lower static component 33 by means of screws 68 (see FIG. 7). The second rotating part 44 of the magnetic gear arrangement 20 is preferably attached to the output shaft 46 by means of the central screw 55. Additionally, blocking elements could be provided interacting between the second rotating part 44 and the output shaft 46, in order to prevent the rotational displacement of the output shaft 46 about the longitudinal axis 24 in respect to the second rotating part 44. The blocking elements could comprise, for example, one or more protrusions (e.g. pins) interacting with respective depressions (e.g. holes). Alternatively, the second rotating part 44 comprises a receiving section 69 into which an insertion part 70 of the output shaft 46 is inserted and thereafter fixed by means of the central screw 55 in a direction parallel to the longitudinal axis 24. The outer circumferential surface of the insertion part 70 corresponds to the inner circumferential surface of the receiving section 69. The inner circumferential surface of the receiving section 69 as well as the outer circumferential surface of the insertion part 70 are both not rotationally symmetric in respect to the longitudinal axis 24 (see FIG. 7). They have, for example, the form of a triangle, a rectangle or any other polygonal form. In FIG. 7 the inner circumferential surface of the receiving section 69 has an annular form with plane or even surfaces on two opposing sides. In this way a torque can be transmitted from the second rotating part 44 to the output shaft 46.

Basically, the electric machine 30 according to the present invention comprises three units rotating at different speeds in respect to one another. A first static unit comprises the static component 33, the stator 31 with the carrier element 37, the anchors 38 and the electric windings 32, the upper end wall 58, the PCB 61 with the connector 40, and the static modulator 48 with the ferromagnetic elements 49. A second fast rotating unit comprises the rotor 34 with the permanent magnets 35, the venting element 22 with the venting blades 50 and the first rotating part 41 with the permanent magnets 42. The fast rotating second unit is rotatably mounted to the static first unit by means of the ball bearings 36, 43. A third unit rotating slower than the second unit comprises the second rotating element 44 with the permanent magnets 45, the cover plate 54 and the output shaft 46. The slowly rotating third unit is rotatably mounted to the static first unit by means of the ball bearings 47.

Figure 9:
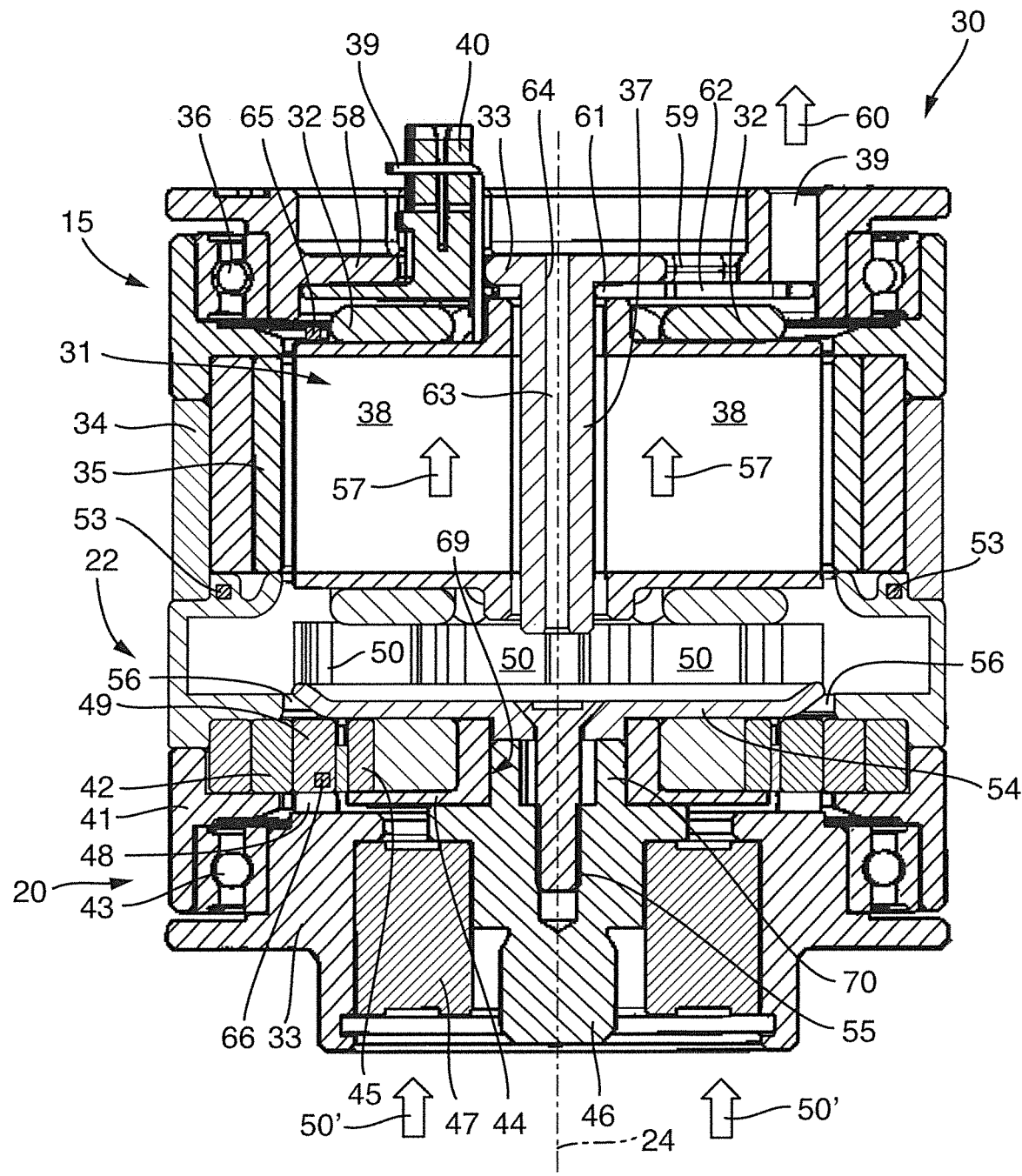
FIG. 9 another preferred embodiment of an electric machine according to the present invention in a sectional view.
Figure 10:
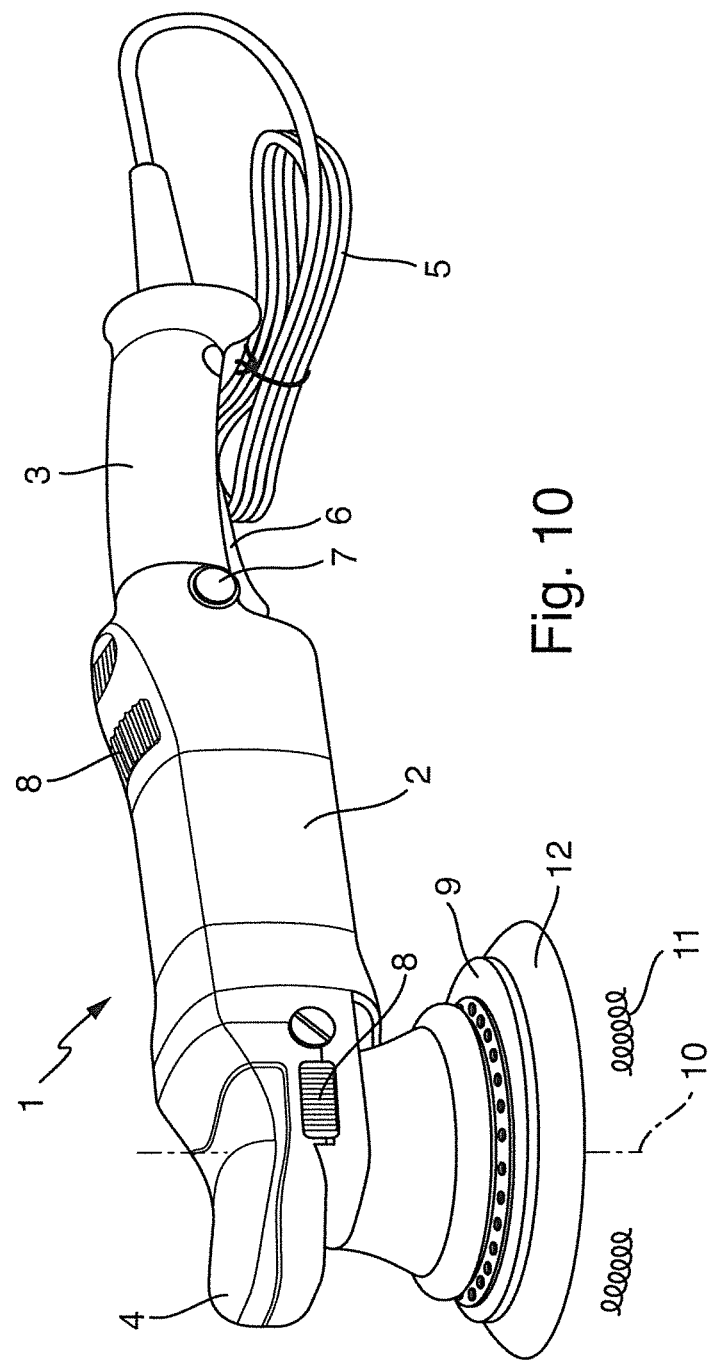
FIG. 10 a preferred embodiment of an electric power tool according to the present invention in a perspective view.

The electric machine 30 according to the invention can be used in any electric appliance. FIGS. 9 and 10 show an example for such an appliance in the form of an electric power tool 1. The power tool 1 equipped with the electric machine 30 is particularly calm during operation (a result of low vibrations and low noise of the electric machine 30), small in dimensions and light in weight (a result of the highly integrated, compact and lightweight electric machine 30), powerful (a result of the overall design of the electric machine 30, including the enhanced cooling of the electric motor 15, allowing an efficient operation) and safe (a result of the double-insulated design of the electric machine 30). Although the power tool 1 is shown as a polishing machine (polisher), alternatively the power tool 1 could be any one of a sander, a grinder, a drill, a percussion drill and an electric screwdriver.

FIG. 9 shows another embodiment of the present invention. All the above explanations previously made in respect to the first embodiment shown in FIGS. 1 to 8 shall apply to the embodiment of FIG. 9, too, unless explicitly mentioned otherwise in the following. In the embodiment of FIG. 9 the venting element 50 is no longer attached to the external rotor 34 of the electric motor 15 and to the first rotating element 41 of the magnetic gear arrangement 20. Rather, it can be seen that the rotor 34 is directly attached to the first rotating element 41 in a torque proof manner. It can be further seen that the venting element 50 is attached to the second rotating part 44 of the magnetic gear arrangement 20. In particular, the venting element 50 is located on a top surface of the cover plate 54 which is attached to the output shaft 46 by means of the central screw 55 and which rotates together with the second rotating element 44 of the magnetic gear arrangement 20. The venting element 50 could even be made in a single common part with the cover plate 54, as both are preferably made of plastic material. The connection between the venting element 50 and the second rotating part 44 of the magnetic gear arrangement 20 should be torque proof in order to make the venting element 50 rotate together with the second rotating part 44 during operation of the electric machine 30. This embodiment may have an advantage compared to the first embodiment in terms of structural stability of the fast rotating parts of the electric machine 30, in particular of the rotor 34 and the first rotating part 41. It may be slightly inferior to the first in terms of cooling efficiency stop nonetheless, the second embodiment also provides for an additional cooling of internal parts of the electric machine 30.

During operation of the electric machine 30, the venting element 50 rotates together with the second rotating part 44 of the magnetic gear arrangement 20. The venting element 50 being of the aspiration type will then create a cooling air stream 57 along the internal windings 32 of the starter 31 of the electric motor 15. In particular, air 50' from the environment will enter the electric machine, for example through the bearings 47, which do not seal the static element 33 and the output shaft 46 in an airtight manner. Furthermore, additional venting openings could be provided in the bottom part of the static element 33 connecting the environment with the second rotating part 44 or the venting element 50, respectively. The air could then flow through the magnetic gear arrangement 20 and the circular gap 56 provided between the fast rotating rotor 34 and first rotating part 41, respectively, on the one hand and an external circumferential border of the cover plate 54 and the venting element 50, respectively, on the other hand. Then, the air stream will continue to flow through the static part of the electric motor 15, in particular along the windings 32 and through the venting channel 63. Finally, the air stream 60 will leave the internal part of the electric machine 30 through the venting openings 59 and the central opening 64 provided in the upper end wall 58 and through the through holes 62 provided in the PCB 61, if present.

In contrast to what is shown in FIG. 9, it would be possible to realise the rotor 34 and the first rotating element 41 as a single common part. Such an embodiment is shown in FIG. 12. In that embodiment, instead of providing two separate sets of permanent magnets, the second number of permanent magnets 35 for the rotor 34 and the third number of permanent magnets 42 for the first rotating part 41, these permanent magnets 35, 42 are each realised as single common magnets extending all the way from the rotor 34 to the first rotating part 41.

Figure 11:
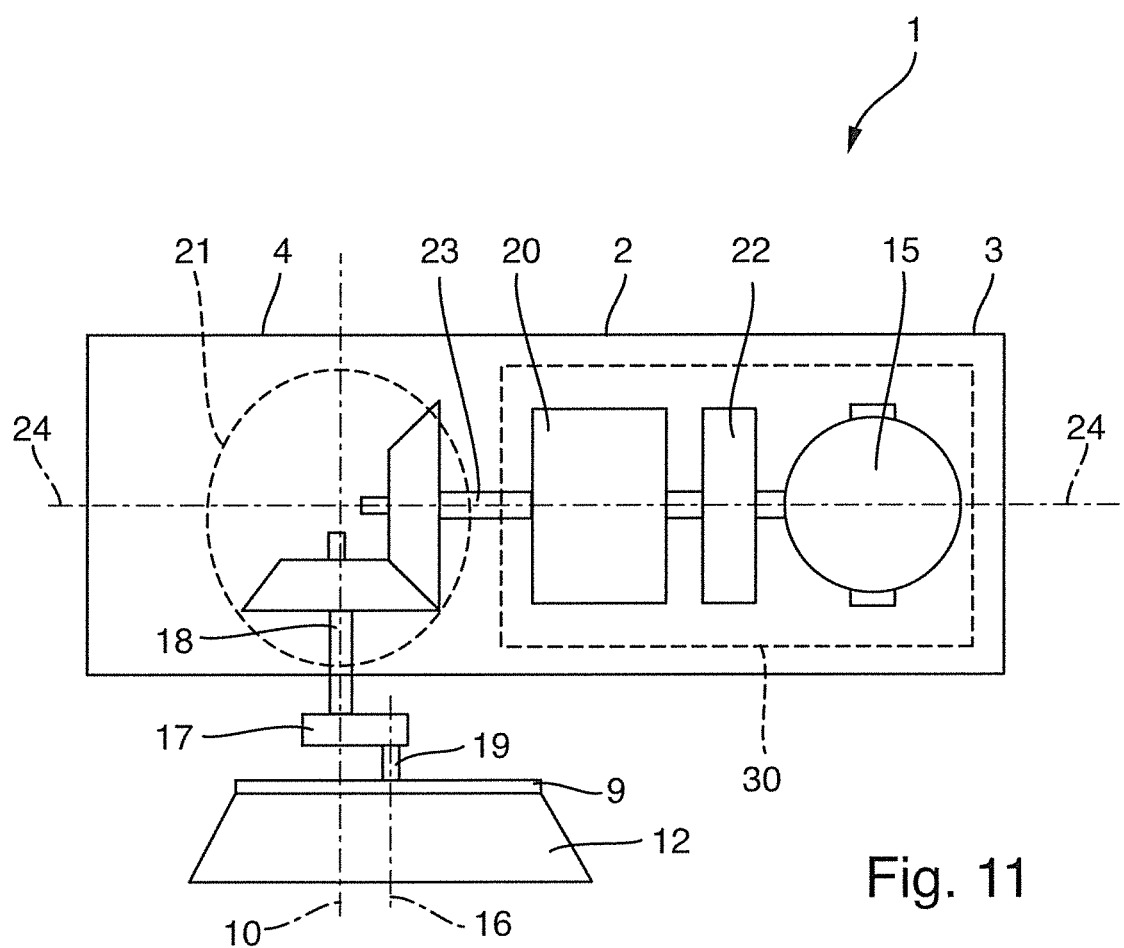
FIG. 11 schematically a sectional view of the power tool of FIG. 10.

FIG. 10 shows an example of a hand held and hand guided electric power tool 1 according to the present invention in a perspective view. FIG. 11 shows a schematic longitudinal section through the power tool 1 of FIG. 10. The power tool 1 is embodied as a random orbital polishing machine (or polisher). The polisher 1 has a housing 2, essentially made of a plastic material. The housing 2 is provided with a handle 3 at its rear end and a grip 4 at its front end in order to allow a user of the tool 1 to hold the tool 1 with both hands and apply a certain amount of pressure on the grip 4 during the intended use of the tool 1. An electric power supply line 5 with an electric plug at its distal end exits the housing 2 at the rear end of the handle 3. At the bottom side of the handle 3 a switch 6 is provided for activating and deactivating the power tool 1. The switch 6 can be continuously held in its activated position by means of a push button 7. The power tool 1 can be provided with adjustment means (not shown) for setting the rotational speed of the tool's electric motor 15 (see FIG. 11) located inside the housing 2 to a desired value. The housing 2 can be provided with cooling openings 8 for allowing heat from electronic components and/or the electric motor 15 both located inside the housing 2 to dissipate into the environment and/or for allowing cooling air from the environment to enter into the housing 2.

The power tool 1 shown in FIG. 10 has an electric motor 15. The electric motor 15 is preferably of the brushless type. Instead of the connection of the power tool 1 to a mains power supply by means of the electric cable 5, the tool 1 could additionally or alternatively be equipped with a rechargeable or exchangeable battery (not shown) located at least partially inside the housing 2. In that case the electric energy for driving the electric motor 15 and for operating the other electronic components of the tool 1 would be provided by the battery. If despite the presence of a battery the electric cable 5 was still present, the battery could be charged with an electric current from the mains power supply before, during or after operation of the power tool 1. The presence of a battery would allow the use of an electric motor 15 which is not operated at the mains power supply voltage (230V in Europe or 110V in the US and other countries), but rather at a reduced voltage of, for example, 12V, 24V, 36V or 42V depending on the voltage provided by the battery.

The power tool 1 has a disk-like working element 9 (or backing pad) rotatable about a rotational axis 10. In particular, the working element 9 of the tool 1 shown in FIG. 10 performs a random orbital rotational movement 11. With the random orbital movement 11 the working element 9 performs a first rotational movement about a first rotational axis corresponding to rotational axis 10. Spaced apart from the first rotational axis 10 another second axis 16 (see FIG. 11) is defined about which the working element 9 is freely rotatable independently from the rotation of the working element 9 about the first rotational axis 10. The second axis 16 runs through the balance point of the working element 9 and parallel to the rotational axis 10. The random orbital movement 11 is realized by means of an eccentric element 17 attached to a tool shaft 18 in a torque proof manner and in which a rotational shaft 19 of the working element 9 is held and guided freely rotatable about axis 16.

The working element 9 is made of a semi-rigid material, preferably a plastic material, which on the one hand is rigid enough to carry and support a tool accessory 12 for performing a desired work (e.g. polishing or sanding the surface of a vehicle body, a boat or aircraft hull) during the intended use of the power tool 1 and to apply a force to the working element 9 and the tool accessory 12 in a direction downwards and essentially parallel to the working element's rotational axis 10 and which on the other hand is flexible enough to avoid damage or scratching of a surface to be worked by the working element 9 or the tool accessory 12, respectively. For example, in the case where the tool 1 is a polisher, the tool accessory 12 may be a polishing material comprising but not limited to a foam or sponge pad, a microfiber pad, and a real or synthetic lambs' wool pad. In FIG. 10 the tool accessory 12 is embodied as a foam or sponge pad.

The bottom surface of the working element 9 is provided with means for releasably attaching the tool accessory 12. The attachment means can comprise a first layer of a hook-and-loop fastener (or Velcro®) on the bottom surface of the working element 9, wherein the top surface of the tool accessory 12 is provided with a corresponding second layer of the hook-and-loop fastener. The two layers of the hook-and-loop fastener interact with one another in order to releasably but safely fix the tool accessory 12 to the bottom surface of the working element 9. Of course, with other types of power tools 1, the working element 9 and the tool accessory 12 may be embodied differently. The power tool 1 according to the present invention can be any type of power tool provided with a working element 9 performing some kind of working movement (purely rotational, roto-orbital (gear driven), random orbital or purely orbital).

Now turning to the inside of the power tool 1 shown in FIG. 11, it can be seen that the electric motor 15 makes part of an electric machine 30 according to the present invention which also comprises a magnetic gear arrangement 20 as well as a venting element 22 located between the electric motor 15 and the magnetic gear arrangement 20. The magnetic gear arrangement 20 is of the coaxial type, where a rotating input element (an external rotor of the electric motor 5) rotates about the same longitudinal axis 24 of the electric machine 30 as an output shaft 23. Furthermore, the power tool one is provided with a bevel gear arrangement 21 for translating a rotation of the output axis about the longitudinal axis 24 into a rotation of the tool shaft 18 about the rotational axis 10. The rotational speeds of the output shaft 23 and of the tool shaft 18 may be the same or defer from one another. The bevel gear arrangement 21 is necessary because the power tool 1 is an angular polisher, where the output shaft 23 runs in a certain angle (preferably between 90° and below 180°) in respect to the tool shaft 18. In the shown embodiment the angle is exactly 90°.

The present invention has been explained by means of one possible embodiment in the form of an electric machine 30 for use in an angular random orbital polisher 1. However, the electric machine 30 according to the present invention can be used in a variety of other appliances, too. Depending on the gear arrangement(s) 20, 21 and other components (e.g. the eccentric element 17) used in the power tool 1, the working element 9 may perform one of a purely rotational, a random-orbital a roto-orbital (gear driven) and a purely orbital working movement 11.

The invention claimed is:

1. Electric machine comprising an electric motor and a magnetic gear arrangement,
   wherein the electric motor is a brushless motor,
   wherein the electric motor comprises
   an internal stator with a first number of electric windings in the form of wire coils disposed circumferentially around a longitudinal axis of the electric machine and
   an external rotor with a second number of permanent magnets of alternating polarities rotatable externally around the internal stator about the longitudinal axis during operation of the electric motor,
   wherein the magnetic gear arrangement is located in a manner displaced along the longitudinal axis in respect to the electric motor, and
   wherein the magnetic gear arrangement comprises
   a first magnetic element with a third number of permanent magnets,
   a second magnetic element with a fourth number of permanent magnets, and
   a modulator comprising a fifth number of ferromagnetic elements disposed between the third number of permanent magnets and the fourth number of permanent magnets,
   wherein the first magnetic element, the second magnetic element and the modulator are rotatable in respect to each other about the longitudinal axis, wherein one of the first magnetic element and second magnetic element or the modulator is connected to the external rotor of the electric motor, and wherein another one of the first magnetic element and second magnetic element or the modulator is connected to an output shaft of the electric machine,
   wherein a venting element is attached to or forms part of the external rotor of the electric motor and the first magnetic element of the magnetic gear arrangement, and the venting element is made of an electrically isolating material including a plastic material.

2. Electric machine according to claim 1, wherein
   the first magnetic element is rotatable about the longitudinal axis and connected to the external rotor of the electric motor,
   the second magnetic element is rotatable about the longitudinal axis, located internally in respect to the third number of permanent magnets and connected to the output shaft of the electric machine, and
   the modulator is static.

3. Electric machine according to claim 1, wherein the venting element comprises reinforcing metal sections, including at least one metal ring embedded in or surrounding the electrically isolating material of the venting element, for safe attachment of the venting element to the external rotor and the first magnetic element.

4. Electric machine according to claim 1, wherein the venting element is located between the electric motor and the magnetic gear arrangement, thereby electrically isolating the electric motor from the magnetic gear arrangement.

5. Electric machine according to claim 4, wherein the venting element supports the third number of permanent magnets of the first magnetic element of the gear arrangement.

6. Electric machine according to claim 1, wherein the venting element is designed as a radial venting element providing for a radial air stream into or out of the electric machine.

7. Electric machine according to claim 6, wherein the venting element comprises a plurality of venting blades having an extension essentially parallel to the longitudinal axis and with a radial component, the venting blades being oriented such that during operation of the electric machine the radial air stream is drawn radially through the venting element.

8. Electric machine according to claim 6, wherein the electric machine has at least one air guiding element which guides the radial air stream coming from the venting element towards the electric motor, or which guides the air stream coming from the electric motor towards the venting element.

9. Electric machine according to claim 1, wherein the electric machine comprises an upper end wall with at least one venting opening which opens towards the internal stator of the electric motor.

10. Electric machine according to claim 1, wherein the internal stator comprises a central carrier element having an axial extension along the longitudinal axis, to which a first number of radially extending anchors is attached around which the wire coils of the electric windings are wrapped, wherein the central carrier element comprises a venting channel having an axial extension along the longitudinal axis and leading into a central opening in an upper end wall of the electric machine.

11. Electric machine according to claim 1, wherein the electric machine comprises at least one contactless position detection sensor for determining a rotational position of the external rotor of the electric motor in respect to the internal stator.

12. Electric machine according to claim 1, wherein the electric machine comprises at least one contactless position detection sensor for determining a rotational position of the second magnetic element of the magnetic gear arrangement and/or of the output shaft of the electric machine.

13. Electric power tool comprising a housing and an electric motor and a magnetic gear arrangement both located within the housing, and further comprising a tool shaft to which a working element is attached, wherein the electric power tool (1) comprises an electric machine having the electric motor and the magnetic gear arrangement,
  wherein the electric motor is a brushless motor,
  wherein the electric motor comprises
    an internal stator with a first number of electric windings in the form of wire coils disposed circumferentially around a longitudinal axis of the electric machine and
    an external rotor with a second number of permanent magnets of alternating polarities rotatable externally around the internal stator about the longitudinal axis during operation of the electric motor,
  wherein the magnetic gear arrangement is located in a manner displaced along the longitudinal axis in respect to the electric motor, and
  wherein the magnetic gear arrangement comprises
    a first magnetic element with a third number of permanent magnets,
    a second magnetic element with a fourth number of permanent magnets, and
    a modulator comprising a fifth number of ferromagnetic elements disposed between the third number of permanent magnets and the fourth number of permanent magnets,
  wherein the first magnetic element, the second magnetic element and the modulator are rotatable in respect to each other about the longitudinal axis, wherein one of the first magnetic element and second magnetic element or the modulator is connected to the external rotor of the electric motor, and wherein another one of the first magnetic element and second magnetic element or the modulator is connected to an output shaft of the electric machine,
  wherein a venting element is attached to or forms part of the external rotor of the electric motor and the first magnetic element of the magnetic gear arrangement, and the venting element is made of an electrically isolating material, including a plastic material.

14. Electric power tool according to claim 13, wherein the electric power tool is one of a sander, a polisher, a grinder, a drill, a percussion drill and an electric screwdriver, and/or wherein the working element performs one of a purely rotational, a random-orbital, a roto-orbital and a purely orbital working movement.

\* \* \* \* \*